United States Patent [19]

Marra

[11] Patent Number: 4,612,027

[45] Date of Patent: Sep. 16, 1986

[54] METHOD AND APPARATUS FOR FORMING GLASS FIBERS

[75] Inventor: Jerome F. Marra, Granville, Ohio

[73] Assignee: Owens-Cornings Fiberglas Corporation, Toledo, Ohio

[21] Appl. No.: 770,491

[22] Filed: Aug. 29, 1985

[51] Int. Cl.[4] .......................................... C03B 37/085
[52] U.S. Cl. ................................ 65/1; 65/2; 65/12; 264/179; 425/72 S
[58] Field of Search ............... 65/1, 2, 12; 425/72 R, 425/72 S; 264/179

[56] References Cited

U.S. PATENT DOCUMENTS

| | | | |
|---|---|---|---|
| 3,019,078 | 1/1962 | Roberson ........................... | 65/1 X |
| 3,468,643 | 9/1969 | Stalego et al. ..................... | 65/1 |
| 3,607,164 | 9/1971 | Thom et al. ....................... | 65/1 |
| 3,955,951 | 5/1976 | Harris et al. ...................... | 65/1 |
| 4,436,541 | 3/1984 | Pellegrin et al. ................... | 65/2 |
| 4,488,891 | 12/1984 | Grubka et al. .................... | 65/2 |
| 4,525,188 | 6/1985 | Jensen ............................... | 65/1 |
| 4,553,994 | 11/1985 | Greene et al. ..................... | 65/2 |

Primary Examiner—Robert Lindsay
Attorney, Agent, or Firm—Ronald C. Hudgens; Greg Dziegielewski

[57] ABSTRACT

A feeder for the production of glass filaments is provided with dripless and non-dripless fields of stream defining orifices to, in part, have the advantages of dripless as well as non-dripless type feeders.

24 Claims, 6 Drawing Figures

METHOD AND APPARATUS FOR FORMING GLASS FIBERS

TECHNICAL FIELD

The invention disclosed herein relates to the production of glass fibers wherein process interruptions from bead drops and flooding are reduced while providing improved restartability and alloy utilization.

BACKGROUND OF THE INVENTION

In the production of glass filaments, it is conventional to flow streams of molten glass from closely spaced orifices in the bottom or discharge wall of an electrically heated, precious metal alloy feeder or bushing.

For the production of continuous glass filaments, there are two general types of feeders available. The more widely used type employs a bottom wall having stream defining orifices provided in projections or tips, depending from the exterior surface of the bottom wall. The second, a more recently developed type, employs an orificed bottom wall having a plainer exterior surface. The first type is known as a "tipped" feeder; for example, see U.S. Pat. Nos. 4,222,757 and 4,321,074. The second type of feeder is known as a "tipless" feeder; for example, see U.S. Pat. No. 3,905,790.

Historically, glass fiber forming operations have been plagued by primarily two phenomena occurring after a filament break—flooding and bead drops.

Recently, a glass fiber forming system has been developed that dramatically reduces the effects of disruptive filament breaks. U.S. Pat. No. 4,488,891, issued to Grubka et al, discloses a fiber forming system otherwise known as "dripless". That is, during operation if a filament breaks, the glass will cease to flow from the orifice associated with the break while attenuation is maintained from the remaining orifices. Thus, the glass does not drip from the orifice of the reversed filament.

The advantages of such a system are clear. Some of the disadvantages include (1) utilization of higher amounts of alloy and fabricating such feeders; and (2) increased "restart" times, as compared to conventional feeders, when the number of filament breaks ultimately requires the restart of the attenuation process at the disrupted orifices. Since the diameter of the dripless orifice is generally larger than the diameter of the non-dripless orifice, to produce the same diameter fiber, fewer orifices can be located in a given area. Thus, the size of the feeder discharge wall, among other things, must be larger to accommodate an equal number of filament producing orifices.

SUMMARY OF THE INVENTION

This invention provides, in part, the decreased sensitivity to filament breaks provided by the "dripless"-'types of feeders while also providing, in part, the ease of "restartability" provided by the heretofore "conventional", or non-dripless types of feeders, as well as providing an opportunity to improve alloy utilization.

This is accomplished by designing the feeder to incorporate a dripless section or sections and a non-dripless section or sections. Desirably, the dripless sections are located on the discharge wall in areas more prone to filament breaks than other areas on the discharge wall.

Historically, the filaments being attenuated from orifices at the ends and corners of the feeders are more prone to break than those filaments being attenuated from the central portion of the feeder. As such, the ends and/or corners of the feeder fabricated according to the principles of the present invention are designed to be dripless while the central portion of the feeder is designed as a conventional or non-dripless type.

BEST MODE OF CARRYING OUT THE INVENTION

Figure 1:
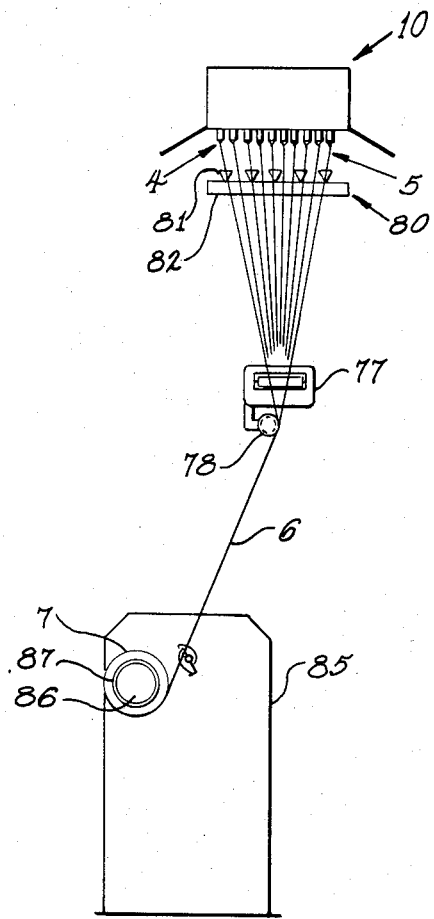
FIG. 1 is a schematic front elevational view of a glass fiber forming operation.

As shown in FIG. 1, conically shaped streams of molten glass, otherwise known as forming cones, are attenuated into a plurality of filaments 5 through the action of attenuation means or winder 85. The newly formed filaments 5 receive a protective coating or sizing from coating applicator 77 as is known in the art. The coated filaments 5 are then gathered into a strand 6 at gathering means 78, which is collected as a helically wound package 7 on sleeve 87 positioned on collet 86 of winder 85.

As such, the filaments formed are continuous filaments. However, it is to be understood that the feeders employing the principles of the present invention are also readily available for the formation of discontinuous filaments and/or association with other attenuative means. Further, such feeders may be employed in the fiberization of other inorganic materials.

As shown in FIG. 1, cooling means 80 is comprised of a manifold 82 having a plurality of nozzles 81 adapted to direct a stream or streams of cooling air towards the streams of molten glass and discharge wall 15 of feeder 10. As will be discussed in more detail later herein, the feeders designed according to the principles of this invention are contemplated for use with other cooling systems.

Figure 2:
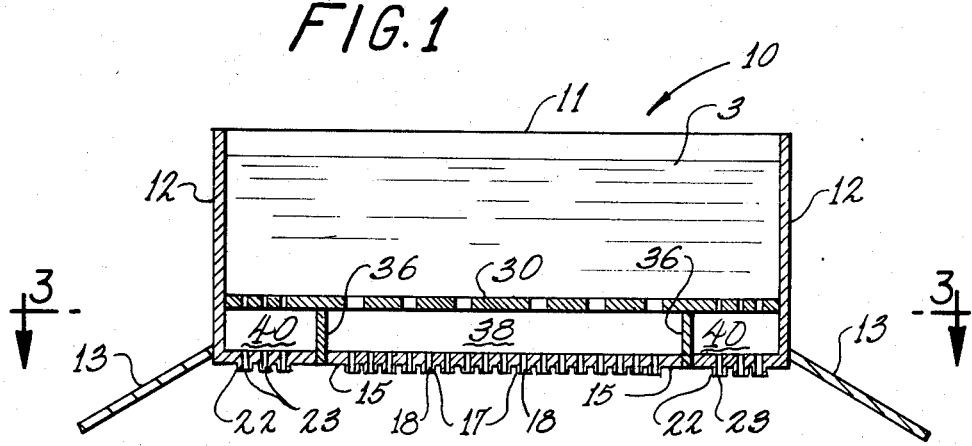
FIG. 2 is an enlarged cross-sectional view of the feeder shown in FIG. 1.
Figure 3:
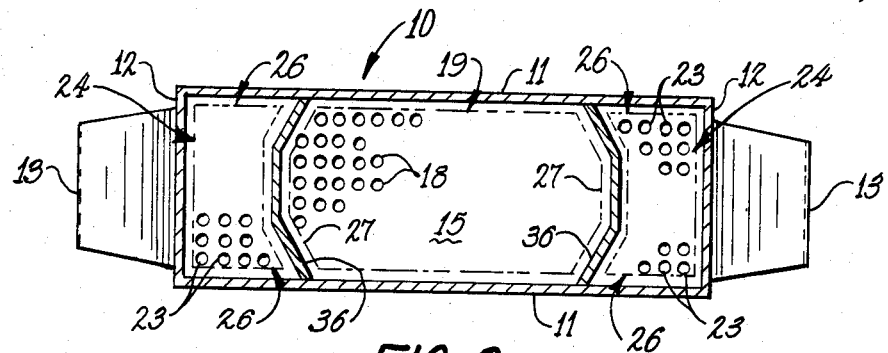
FIG. 3 is a cross-sectional view of the feeder shown in FIG. 2, taken along view 3—3.
Figure 4:
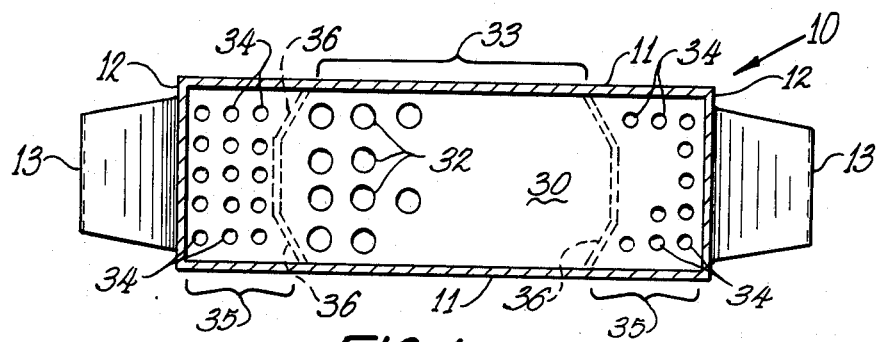
FIG. 4 is a top view of the feeder shown in FIG. 2.

As shown in FIGS. 2, 3 and 4, feeder 10 is comprised of a pair of sidewalls 11, endwalls 12 and a discharge wall 15 to form a container to retain the pool or body of molten glass 3 therein. As is known in the art, a pair of terminals, or ears 13, are attached to the end walls 12 (or discharge wall 15). Ears 13 are adapted to be connected to a suitable source of electrical energy (not shown) to provide electrical resistance heating of feeder 10.

According to the principles of this invention, the feeder is designed to incorporate at least two different types of glass delivery systems to provide dripless and non-dripless operating characteristics from predetermined fields of orifices in discharge wall 15. The aforementioned U.S. Pat. No. 4,488,891, which is entirely incorporated herein by reference, describes in detail the design parameters for producing a "dripless" operation. In short, dripless operation is established by reducing the pressure of the molten glass at the orifices to a pressure less than the internal pressure of a bead formed at an orifice upon the cessation of filament attenuation at that orifice but greater than the internal pressure of the forming cones during attenuation. As such, the reduced pressure of the molten glass at the discharge plate orifices prevents bead growth and drop from the orifices whereby the flow of molten glass from the disrupted orifices ceases.

Conveniently, the pressure of the molten glass is reduced by means of a pressure control plate which imposes a pressure drop in the supply of molten glass which is (a) proportional to the rate of molten glass flow, and (b) effective to reduce the pressure above the orifice plate to a pressure (1) less than the internal pressure of the bead formed at a given orifice upon breakout at that orifice while the remainder of the orifices operate normally to produce filaments, and (2) greater than the internal pressure of the cones established during steady state attenuation.

The pressure control plate is specifically designed, in terms of plate thickness, aperture size and aperture density with relation to the flow rate during fiberization to provide a pressure drop of such magnitude that the pressure at the exit ends of the orifices of the discharge wall preferably is substantially atmospheric. Even though the pressure at the discharge wall orifices has been reduced to such an extent that, upon a filament break at one of the orifices, the flow of molten glass from the orifice stops yet the pressure is sufficient for maintenance of fiber formation at the remaining orifices.

Of course, the thermal aspects of the fiber forming systems disclosed in the aforementioned "dripless" patent can be incorporated in the present invention to reduce or prevent "flooding", if desired.

As employed herein, "non-dripless" refers to the type of feeder design wherein molten glass continues to flow from the orifice to form a dripable bead or flow randomly over the face of the discharge wall after a filament break at that orifice.

The hybrid dripless/non-dripless feeder, as shown herein, incorporates a pressure control plate 30 having (1) a group 35 of apertures 34 in communication with field 24 of orifices 23 in discharge wall 15 to provide dripless operation at such orifices and (2) a group 33 of apertures 32 in communication with field 19 of orifices 18 in discharge wall 15 to provide non-dripless operation at such orifices. Further, each orifice 18 and 23 is located in a projection or tip 17 and 22, respectively, which extends from discharge wall 15. Of course, it is to be understood that more than one orifice can be located in a projection, if desired. As shown in the FIGS. 2, 3 and 4, the non-dripless field 19 is generally centrally located on discharge wall 15, and dripless fields 24 are located at the ends of discharge wall 15.

Desirably, the dripless fields are located on the discharge wall at zones wherein filament breaks generally occur more frequently than the other zones. Historically, the filaments being drawn from orifices located at the ends and corners of such feeders are generally more prone to breaks. Thus, the dripless fields are positioned there.

Such dripless fields may have any suitable shape. As shown in FIGS. 3 and 4, the dripless fields 24 are non-rectangular and are of a "crescent" shape, since the inboard extremities 26 of the fields 24 extend further inwardly on the discharge wall than the remainder of the inboard edge 27 of field 24.

According to the principles of this invention, pressure control plate 30 acts as a regulator means to reduce the pressure at orifices 23 of dripless field 24 to produce the desired dripless operation as described herein while maintaining sufficient pressure at orifices 18 of the non-dripless field 19 to provide the non-dripless operation.

As shown in FIG. 4, apertures 32 of pressure plate 30 are of sufficient size and quantity to provide the non-dripless operation desired. On the other hand, apertures 34, which are associated with the dripless orifices 23, are of a size and quantity to produce the pressure reduction for a dripless operation.

As shown in FIGS. 2, 3 and 4, pressure plate 30 is spaced immediately above discharge wall 15. Partitions extend between discharge wall 15 and pressure control plate 30 to divide the space or region between wall 15 and plate 30 into three separate chambers. Chamber 38 is in communication with non-dripless orifices 18 and apertures 32. According to the principles of this invention, apertures 32 are of a sufficient size and quantity to not reduce the pressure of the glass in chamber 38 sufficient to establish dripless operation. The pressure of the molten glass within chambers 40, which are associated with and in communication with orifices 23 of dripless fields 24, is reduced in pressure upon flow through apertures 34 of plate 30 to establish the desired dripless operation.

As shown in the drawings, the pressure control plate extends from endwall to endwall and sidewall to sidewall covering (non-dripless) chamber 38 and both chambers (dripless) 40. It is to be understood, however, that that portion of pressure plate 30 defining non-dripless chamber 38 may be dispensed with, in whole or in part, if desired, the pressure reduction only being required at chambers 40.

Although the discharge walls of the feeders shown herein employ the "tipped" design, it is to be understood that the dripless/non-dripless design of the instant invention is contemplated for use with "tipless" type feeders as well.

Figure 5:
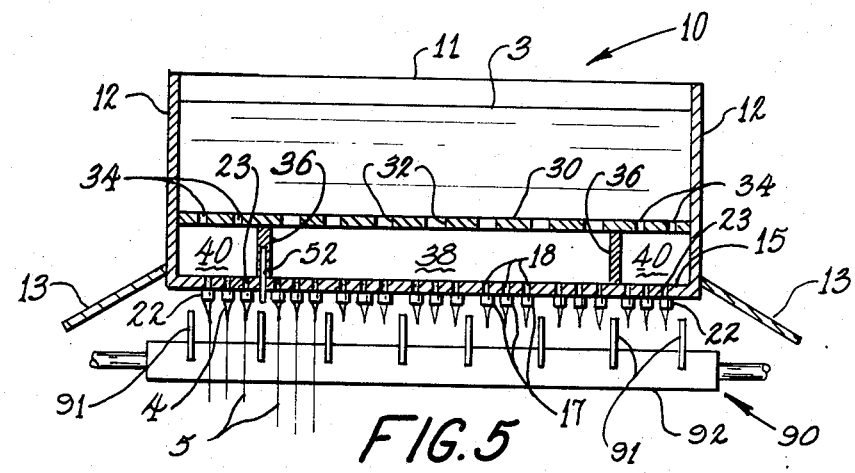
FIG. 5 is an enlarged frontal cross-sectional view of an alternative feeder and cooling means similar to that shown in FIG. 1 according to the principles of this invention.
Figure 6:
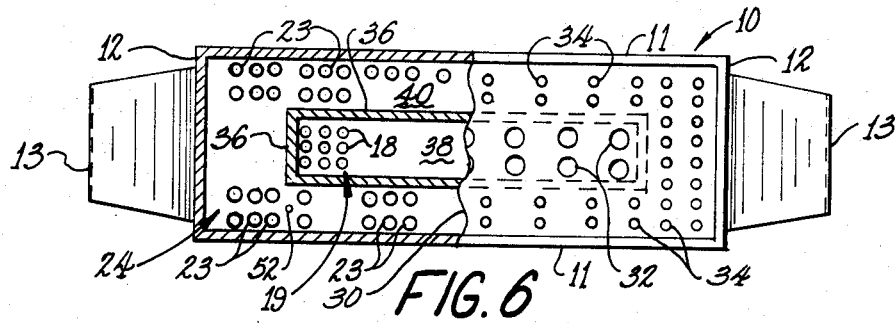
FIG. 6 is a partially sectioned top view of the feeder shown in FIG. 5.

Partitions 36 located between discharge wall 15 and pressure control plate 30, cooperate with sidewalls 11 to prevent glass flow and/or pressure communication between non-dripless chamber 38 and dripless chambers 40. As shown in FIGS. 5 and 6, feeder 10 is comprised of sidewalls 11, endwalls 12 and a discharge wall 15, which has one peripheral field 24 of projections 22 and orifices 23 adapted for dripless operation and one control field 19 of projections 17 and orifices 18 for non-dripless operation. As such, the dripless field 24 extends around the entire periphery of discharge wall 15, and thus, so does chamber 40, which is in communication with apertures 34 to produce the requisite pressure drop under normal temperature glass flow conditions. Partition 36 extends between discharge wall 15 and pressure control plate 30 and defines and separates chamber 38 from chamber 40.

Projections 17 and orifices 18 therethrough which comprise field 19 are in communication with chamber 38 which receives a supply of molten glass through apertures 32 located in pressure control plate 30. As stated before, the pressure drop established by the molten glass flowing through the apertures 32 is insufficient for producing a pressure drop of an amount sufficient to generate dripless operation at such orifices. Thus, sufficient pressure is maintained at the non-dripless orifices 18 such that the molten glass continues to flow from an orifice 18 and such field 19 when a filament break occurs at such orifice.

A vent tube 52 extends through discharge wall 15 into dripless chamber 40 to a point immediately below pressure plate 30 to permit air that might be otherwise trapped within chamber 42 to pass through vent 52 into the atmosphere surrounding feeder 10. Since the pressure within chamber 40 is preferably at approximately atmospheric pressure, the molten glass does not continue to flow out of and to 52, once chamber 40 has been filled with molten glass.

As shown in FIG. 5, cooling means 90 is of the "fin" type. That is, cooling means 90 is comprised of a plurality of blade-like heat transfer members or fins 91 extending between the projection 17 and 22. The heat transfer members 91 are suitably attached to a water-cooled manifold 92 as is known in the art. To accommodate the heat transfer members 91, the projections 17 and 22 are arranged in rows. As shown, the non-dripless projections 17 are arranged in pairs of rows, while the dripless projections 22/orifices 23 are arranged in three rows per group. Of course, more than one such group can be located in each of the fields, if desired. Preferably, each three row group of projections 22 is arranged in a staggered arrangement as set forth in co-pending U.S. patent application Ser. No. 754,691, filed on July 12, 1985 in the name of Frank O'Brien-Bernini, Terry J. Hanna, Jack L. Emerson and Robert L. Hill, which is totally incorporated herein by reference.

Thus, by incorporating distinct and separate dripless and non-dripless fields sections in one feeder, the benefits of dripless operation can be provided for those portions of the feeder most prone to filament breakage to permit long periods of uninterrupted operation and the benefits of non-dripless type of feeder design can be provided to reduce the amount of alloy required and to provide a substantial area of the discharge wall capable of being easily restarted, to combine in part, the best features of dripless and non-dripless feeder designs.

It is apparent that within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

I claim:

1. A method of forming glass filaments from a feeder comprising:
   supplying streams of molten glass to be attenuated into filaments from a first field of orifices in said feeder;
   supplying streams of molten glass to be attenuated into filaments from a second field of orifices in said feeder;
   attenuating the streams of glass into filaments; and
   reducing the pressure of the molten glass at the first field of orifices to a pressure less than the internal pressure of a bead formed at an orifice upon the cessation of filament attenuation at that orifice, but greater than the internal pressure of a forming cone of glass established during attenuation at one of said orifices of said first field without so reducing the pressure of the molten glass at the second field of orifices.

2. The method of claim 1 wherein said filaments are continuous.

3. A method of forming glass filaments from a feeder comprising:
   (a) supplying streams of molten glass to be attenuated into filaments from a plurality of orifices, said orifices being arranged as a plurality of fields in a discharge wall;
   (b) attenuating the streams of glass into filaments; and
   (c) reducing the pressure of the molten glass in at least one of said fields during said attenuation to such an extent that upon a filament break at one of said orifices of such field, the flow of molten glass from that orifice stops, yet the pressure is sufficient for filament formation at the other orifices of that field; while
   (d) maintaining the pressure of the molten glass in at least one of said other fields such that molten glass continues to flow from an orifice in such field when a filament break occurs at such orifice.

4. The method of claim 3 wherein said molten streams are attenuated into continuous filaments.

5. The method of claim 3 wherein the fields associated with step (c) are located on the discharge wall at zones wherein filament breaks generally occur more frequently than other zones on the discharge wall.

6. The method of claim 3 wherein said discharge wall contains a centrally located field of orifices associated with step (d) and a field of orifices associated with step (c) at each lateral end thereof.

7. The method of claim 6 wherein the fields of orifices located at the lateral ends of the discharge wall are non-rectangular in shape.

8. The method of claim 7 wherein the inboard extremities of the fields located at the lateral ends of the discharge wall extend further inwardly on the discharge wall than the remainder of the inboard edge of such field between said extremities.

9. The method of claim 3 wherein said discharge wall has a plurality of projections containing said orifices and further comprising flowing a coolant gas over said streams and projections.

10. The method of claim 9 wherein each projection has only one orifice extending therethrough to define said streams.

11. The method of claim 3 wherein the discharge wall is planar and tipless.

12. The method of claim 3 wherein step (c) is carried out by the flowing glass through a perforate pressure plate located above such fields to impose a pressure drop in the flow of molten glass to such fields of orifices sufficient to reduce the pressure in the body immediately above the discharge wall to substantially atmospheric pressure.

13. A feeder for supplying molten streams of glass to be attenuated into filaments comprising:
   a discharge wall having a plurality of stream defining orifices therein, said orifices being arranged as a plurality of fields;
   regulator means for (1) reducing the pressure of the molten glass in at least one of said fields during said attenuation to such an extent that upon a filament break at one of said orifices of such field, the flow of molten glass from that orifice stops, yet the pressure is sufficient for filament formation at the other orifices of that field; while (2) maintaining the pressure of the molten glass in at least one of said other fields such that molten glass continues to flow from an orifice in such field when a filament break occurs at such orifice.

14. The feeder of claim 13 wherein said regulator means is comprised of:
- a pressure control plate spaced from the discharge wall, said pressure control plate having a plurality of apertures therethrough, said apertures being arranged in groups corresponding to the fields of the discharge wall to effect said pressure reduction and said pressure maintenance; and
- partition means located between the discharge wall and the pressure control plate to divide the region between discharge wall and pressure plate into a plurality of chambers in communication with said orifices and apertures, said partitions being adapted to prevent the flow of glass between chambers.

15. The apparatus of claim 13 wherein said discharge wall has projections having said stream defining orifices therein.

16. The apparatus of claim 13 wherein said regulator means is comprised of a pressure control plate having at least one group of apertures therein to effect said pressure reduction at such field of orifices, and
- partition means for preventing glass flow and pressure communication between the field of orifices associated with said reduced pressure and the other fields of orifices.

17. The apparatus of claim 16 wherein the fields of orifices associated with said pressure reduction are located on the discharge wall at zones wherein filament breaks generally occur more frequently than other zones on the discharge wall.

18. The apparatus of claim 16 wherein a field of orifices associated with said pressure reduction is located at each lateral end of the discharge wall.

19. The apparatus of claim 18 wherein the fields of orifices located at the lateral ends of the discharge wall are non-rectangular in shape.

20. The apparatus of claim 19 wherein such fields have a crescent shape.

21. The apparatus of claim 20 wherein said discharge wall has projections extending therefrom, said projections having one of said orifices extending therethrough.

22. Apparatus for the production of continuous glass filaments comprising:
- feeder means comprised of a feeder for supplying molten streams of glass to be attenuated into filaments comprising: a discharge wall having a plurality of stream defining orifices therein, said orifices being arranged as a plurality of fields; regulator means for effecting dripless operation in at least one of said fields and non-dripless operation in at least one of said other fields;
- cooling means for removing heat from the filament forming region; and
- means for attenuating said molten streams into continuous filaments.

23. The apparatus of claim 22 wherein said cooling means is adapted to supply a flow of cooling air to the filament forming region.

24. The apparatus of claim 22 wherein said cooling means is comprised of a plurality of spaced-apart heat transfer members attached to a fluid cooled manifold, said heat transfer members being positioned between the streams of molten glass.

* * * * *